(12) United States Patent
Deishi

(10) Patent No.: US 7,937,749 B2
(45) Date of Patent: May 3, 2011

(54) METHOD AND SYSTEM FOR MANAGING NETWORK

(75) Inventor: Satoshi Deishi, Ibaraki (JP)

(73) Assignee: Konica Minolta Holdings, Inc., Tokyo (JP)

( * ) Notice: Subject to any disclaimer, the term of this patent is extended or adjusted under 35 U.S.C. 154(b) by 952 days.

(21) Appl. No.: 11/880,626

(22) Filed: Jul. 23, 2007

(65) Prior Publication Data

US 2008/0022104 A1    Jan. 24, 2008

(30) Foreign Application Priority Data

Jul. 24, 2006 (JP) ................. 2006-200720
Jun. 27, 2007 (JP) ................. 2007-168696

(51) Int. Cl.
*H04L 9/32* (2006.01)
(52) U.S. Cl. ................. 726/6; 726/5; 713/175
(58) Field of Classification Search .......... 713/157, 713/175, 155–156; 726/5, 6, 10, 25, 24
See application file for complete search history.

(56) References Cited

U.S. PATENT DOCUMENTS

| 6,148,400 | A | 11/2000 | Arnold | 713/168 |
| 6,263,435 | B1 | 7/2001 | Dondeti et al. | 713/163 |
| 6,705,517 | B1* | 3/2004 | Zajkowski et al. | 235/379 |
| 7,275,155 | B1* | 9/2007 | Aull | 713/157 |
| 2003/0163702 | A1 | 8/2003 | Vigue et al. | 713/176 |
| 2005/0097332 | A1* | 5/2005 | Imai | 713/176 |
| 2005/0160476 | A1* | 7/2005 | Kakii | 726/5 |

OTHER PUBLICATIONS

IETF RFC2459, R. Housley et al, Network Working Group, "Internet X.509 Public Key Infrastructure Certificate and CRL Profile" Jan. 1999, pp. 1-114.
IETF RFC2246, T. Dierks et al, Network Working Group, "The TLS Protocol Version 1.0" Jan. 1999, pp. 1-60.
Internet-Draft, 302, Transport Layer Security Working Group, "The SSL Protocol Version 3.0" Nov. 1996, pp. 1-50, A. O. Freier et al.

* cited by examiner

*Primary Examiner* — Edward Zee
(74) *Attorney, Agent, or Firm* — Sidley Austin LLP

(57) ABSTRACT

A network management method and system is provided that issues a digital certificate easily and safely. A digital certificate is issued to a personal computer that is to newly join a network by the following method. A provisional authentication server issues a first digital certificate that is a provisional certificate of the personal computer. The personal computer enters the first digital certificate and a private key corresponding thereto. The personal computer and a formal authentication server establish a connection for encryption communication based on the first digital certificate. After establishing the connection, the formal authentication server generates a second digital certificate that is a formal digital certificate of the personal computer. Further, an experimental network independent of the network is prepared and participation of a personal computer having the first digital certificate into the experimental network is allowed.

15 Claims, 14 Drawing Sheets

| NODE ID | IP ADDRESS | MAC ADDRESS | |
|---|---|---|---|
| PC2 | 192.168.0.112 | xx-xx-xx-xx-xx-02 | ~DTN |
| PC3 | 192.168.0.113 | xx-xx-xx-xx-xx-03 | ~DTN |

| NODE ID | IP ADDRESS | MAC ADDRESS | |
|---|---|---|---|
| PC1 | 192.168.0.111 | xx-xx-xx-xx-xx-01 | ~DTN |
| PC4 | 192.168.0.114 | xx-xx-xx-xx-xx-04 | ~DTN |
| PC7 | 192.168.0.117 | xx-xx-xx-xx-xx-07 | ~DTN |

| NODE ID | IP ADDRESS | MAC ADDRESS | |
|---|---|---|---|
| PC1 | 192.168.0.111 | xx-xx-xx-xx-xx-01 | ~DTN |
| PC6 | 192.168.0.116 | xx-xx-xx-xx-xx-06 | ~DTN |

| NODE ID | IP ADDRESS | MAC ADDRESS |
|---------|---------------|---------------------|
| PC1 | 192.168.0.111 | xx-xx-xx-xx-xx-01 | ~DTN

METHOD AND SYSTEM FOR MANAGING NETWORK

This application is based on Japanese patent application Nos. 2006-200720 and 2007-168696 filed on Jul. 24, 2006 and Jun. 27, 2007, respectively, the contents of which are hereby incorporated by reference.

BACKGROUND OF THE INVENTION

1. Field of the Invention

The present invention relates to a method and system for issuing a digital certificate to an information processing apparatus such as a personal computer or an MFP.

2. Description of the Related Art

Digital certificate technology has recently been widespread for the purpose of preventing communication with so-called "spoofing". However, anyone can create a digital certificate itself by the use of well-known technology. For this reason, other person may possibly create a digital certificate without permission and abuse the same.

In order to avoid such a situation, in the case where communication is performed in an open network such as the Internet, usually, a digital certificate is used for which a reliable Certificate Authority (CA) provides a digital signature.

At the time of performing communication, a person to whom a digital certificate was issued uses a private key that a Certificate Authority gave only to the person and executes a digital signature on data that is a communication target. Thereby, confidence can be given to the other end of the communication. Accordingly, the private key should be so handled that it is not stolen by other people.

A Certificate Authority generally uses confidential mail in order to ensure the delivery of a private key to an applicant himself/herself. Further, of a public key prepared in a terminal in advance and a private key corresponding thereto, the Certificate Authority accepts the public key. Then, the Certificate Authority executes a digital signature on the public key, thereby to issue a digital certificate.

Incidentally, along with a growing need for a digital certificate, there has been a demand for simplification of issuance of a digital certificate.

While there are proposed application technology concerning confidential communication using a digital certificate as described in U.S. Pat. No. 6,263,435 and U.S. publication No. 2003-163702, nothing is proposed for a method for facilitating the issuance of a digital certificate.

SUMMARY

The present invention is directed to solve the problems pointed out above, and therefore, an object of an embodiment of the present invention is to issue a digital certificate easily and safely.

A method according to one aspect of the present invention is a method for managing an information processing apparatus. The method includes the steps of arranging a first digital certificate issuing organization and a second digital certificate issuing organization, issuing a first digital certificate that is a provisional digital certificate from the first digital certificate issuing organization to an information processing apparatus, establishing a connection for encryption communication, by using the first digital certificate, between the information processing apparatus and the second digital certificate issuing organization, the first digital certificate enabling the information processing apparatus to join a first network that is an experimental network but not enabling the information processing apparatus to join a second network that is a formally operated network, and after establishing the connection between the information processing apparatus and the second digital certificate issuing organization, issuing a second digital certificate that is a formal digital certificate from the second digital certificate issuing organization to the information processing apparatus, the second digital certificate enabling the information processing apparatus to join the second network.

Preferably, the first digital certificate issuing organization may issue the first digital certificate that is a common digital certificate to a plurality of the information processing apparatuses.

Preferably, a validity period may be set for the first digital certificate and the connection between the information processing apparatus and the second digital certificate issuing organization may be established only during the validity period.

Further, the first network and the second network may be established independently of each other.

Preferably, the information processing apparatus may generate a pair of a public key and a private key and sends the public key and identification information to the second digital certificate issuing organization, and the second digital certificate issuing organization may confirm the information processing apparatus based on the identification information, and after that, may issue the second digital certificate including the public key.

Further, the second digital certificate issuing organization may verify that the information processing apparatus is an apparatus authenticated by the first digital certificate issuing organization based on the first digital certificate obtained from the information processing apparatus.

Moreover, a connection for Secure Sockets Layer communication may be established between the information processing apparatus and the second digital certificate issuing organization.

Furthermore, the information processing apparatus may discard the first digital certificate after obtaining the second digital certificate.

The structure described above enables easy and safe issuance of a digital certificate.

These and other characteristics and objects of the present invention will become more apparent by the following descriptions of preferred embodiments with reference to drawings.

BRIEF DESCRIPTION OF THE DRAWINGS

FIGS. 7A-7C show examples of a connection table.

FIG. 10 is a diagram showing an example of a connection table.

DESCRIPTION OF THE PREFERRED EMBODIMENTS

Figure 1:
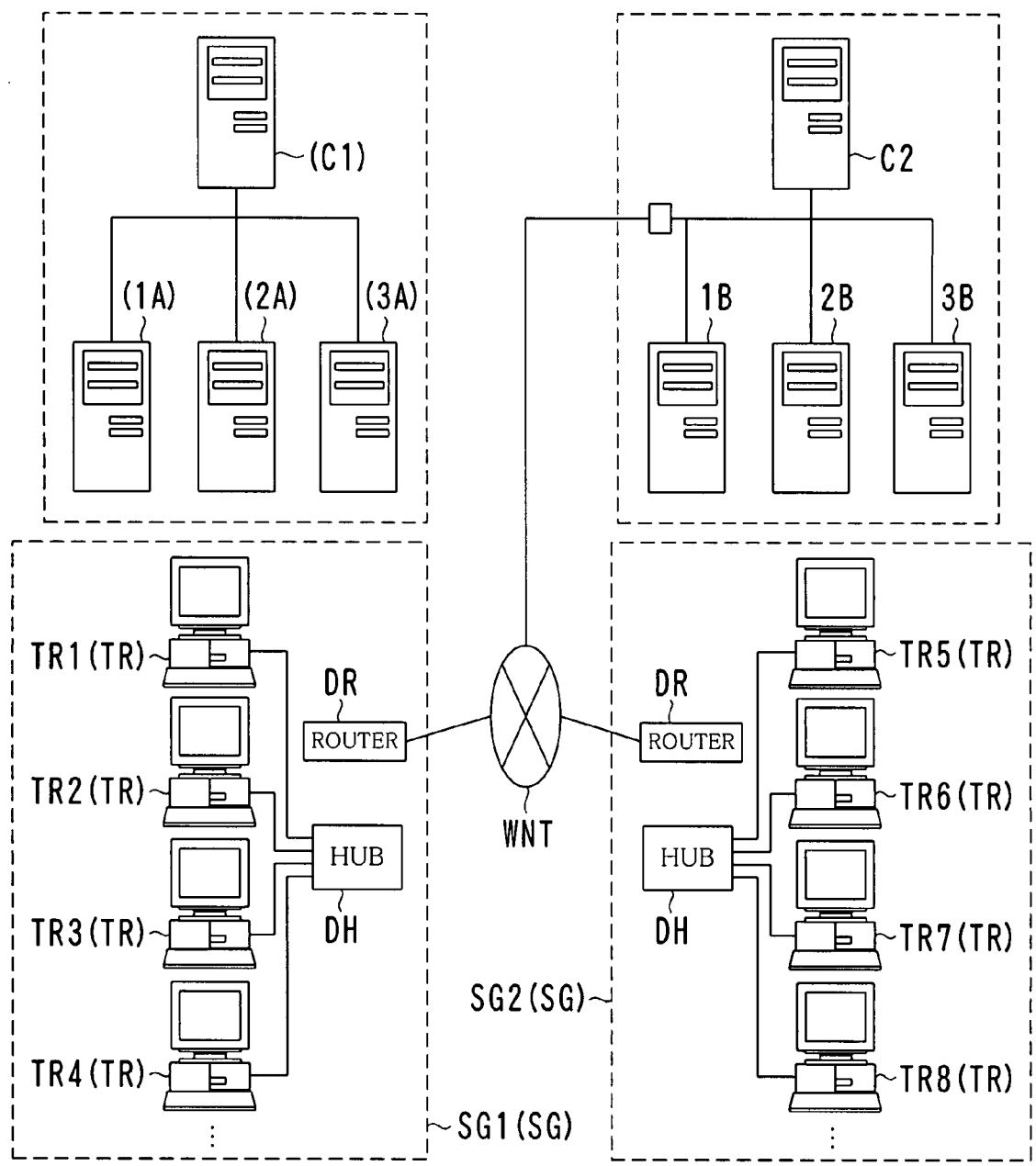
FIG. 1 is a diagram showing an example of the overall configuration of a network.

As shown in FIG. 1, a network NS includes a formal authentication server 1B, a plurality of segments SG (SG1, SG2, . . . and the like) and a wide area communication line WNT. Each of the segments SG includes one or more personal computers TR, a hub DH and a router DR. Hereinafter, each of the personal computers TR may be referred to as a "personal computer TR1", a "personal computer TR2", a "personal computer TR3", . . . and the like to distinguish among the personal computers TR.

The personal computers TR and the router DR that belong to the same segment SG are connected to the hub DH in that segment SG with twisted pair cables. The routers DR in the respective segments SG can be interconnected via the wide area communication line WNT. This enables data communication among the personal computers TR belonging to the segments SG different from one another. The wide area communication line WNT can be the Internet, a dedicated line or a public line. Instead of the hub DH and the router DR, a modem, a terminal adapter, a dial-up router or the like may be used in some cases.

The network NS is a network in the form of peer-to-peer (P2P) and the personal computers TR in the network NS function as nodes. More specifically, the personal computers TR can share the respective resources, e.g., hardware resources such as a CPU, a hard disk drive or a print unit, software resources such as an application, or information resources such as document data, music data or image data.

The network NS is established for, for example, an organization such as a company having a plurality of floors or bases. In such a case, the segments SG are provided for each floor or base. The following is a description of a case of the network NS established in the company X. Assume that the personal computers TR are manufactured and sold by the manufacturer Y.

Figure 2:
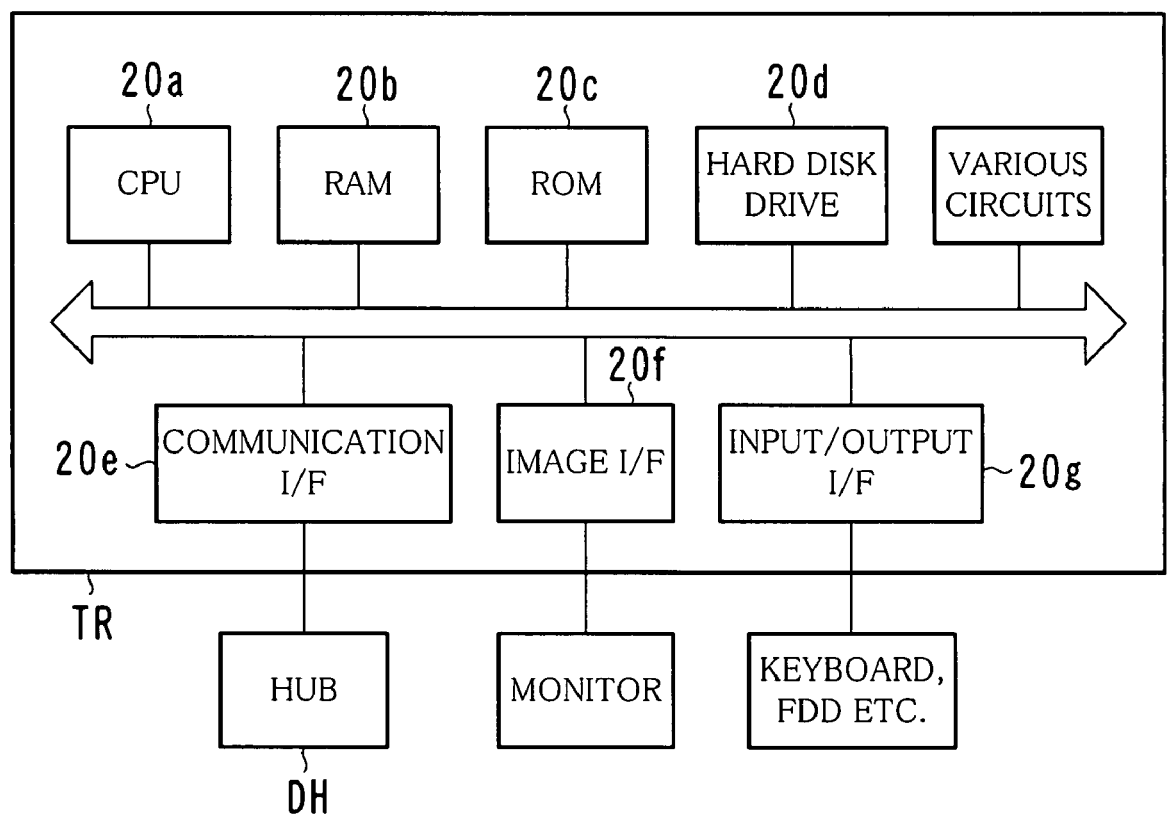
FIG. 2 is a diagram showing an example of a hardware configuration of a personal computer.

As shown in FIG. 2, the personal computer TR includes a CPU 20a, a RAM 20b, a ROM 20c, a hard disk drive 20d, a communication interface 20e, an image interface 20f, an input/output interface 20g and various other circuits or devices.

The communication interface 20e is a Network Interface Card (NIC), and is connected to any of ports of the hub DH via the twisted pair cable. The image interface 20f is connected to a monitor, and is operable to deliver, to the monitor, video signals for displaying images.

The input/output interface 20g is connected to an input device such as a keyboard or a mouse, an external storage device such as a floppy disk drive or a CD-ROM drive, or other devices. The input/output interface 20g inputs from the input device a signal indicating the details of an operation performed by a user using the input device. The input/output interface 20g causes the external storage device to read data recorded on a recording medium such as a floppy disk or a CD-ROM, and then inputs the data. Further, the input/output interface 20g outputs data to be written onto the recording medium to the external storage device.

Figure 3:
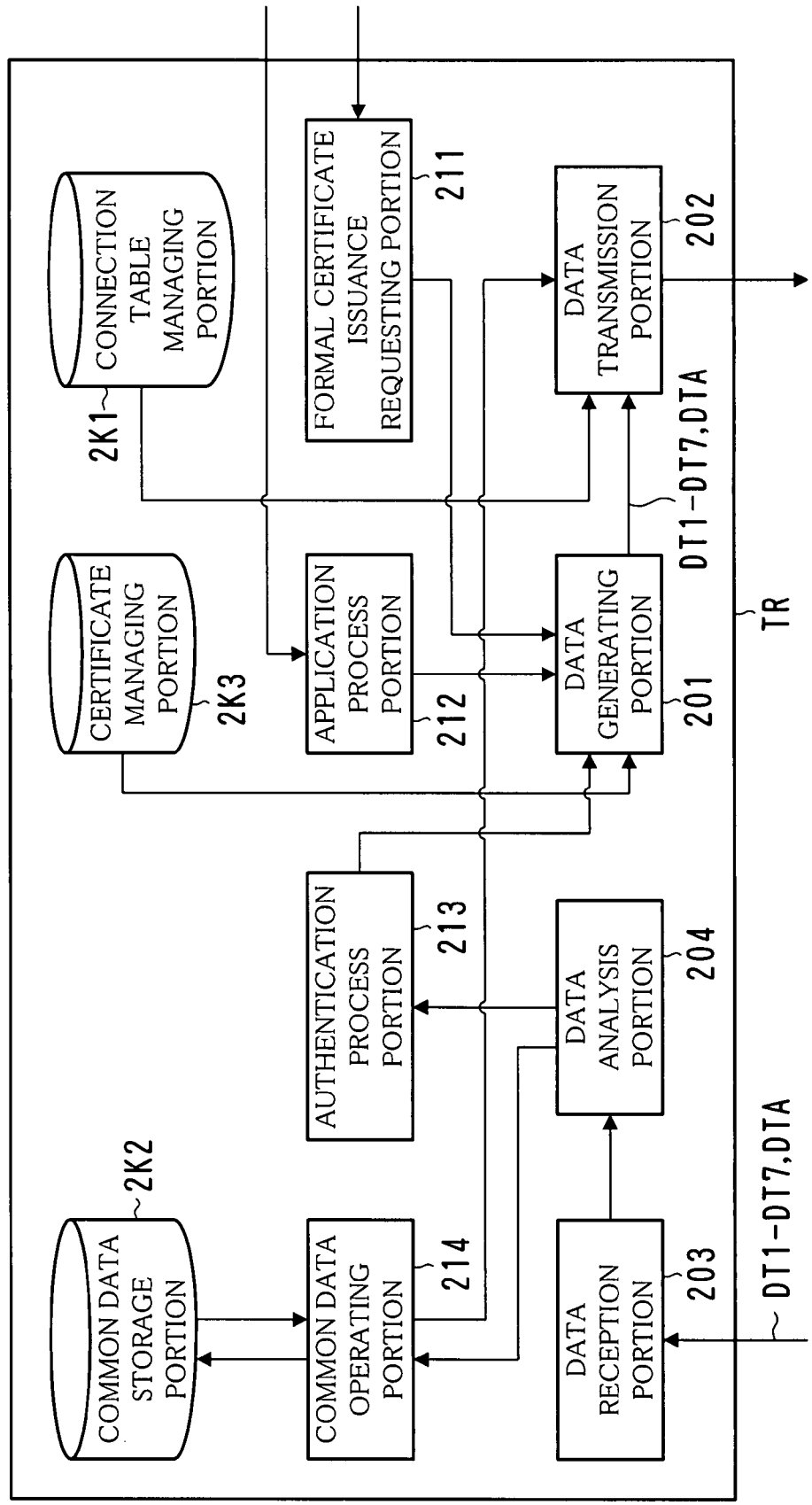
FIG. 3 is a diagram showing an example of a functional configuration of a personal computer.

As shown in FIG. 3, on the hard disk drive 20d are stored programs and data for implementing functions including a data generating portion 201, a data transmission portion 202, a data reception portion 203, a data analysis portion 204, a formal certificate issuance requesting portion 211, an application process portion 212, an authentication process portion 213, a common data operating portion 214, a connection table managing portion 2K1, a common data storage portion 2K2, and a certificate managing portion 2K3. These programs and data are read out to the RAM 20b as necessary, and the programs are executed by the CPU 20a.

The personal computers TR are given a node ID, an IP address and a MAC address each in order to distinguish each personal computer TR from the other personal computers TR. The node ID and the IP address are given in accordance with a rule of the network NS. The MAC address is an address that is fixedly given to the communication interface 20e of that personal computer TR.

Figure 4:
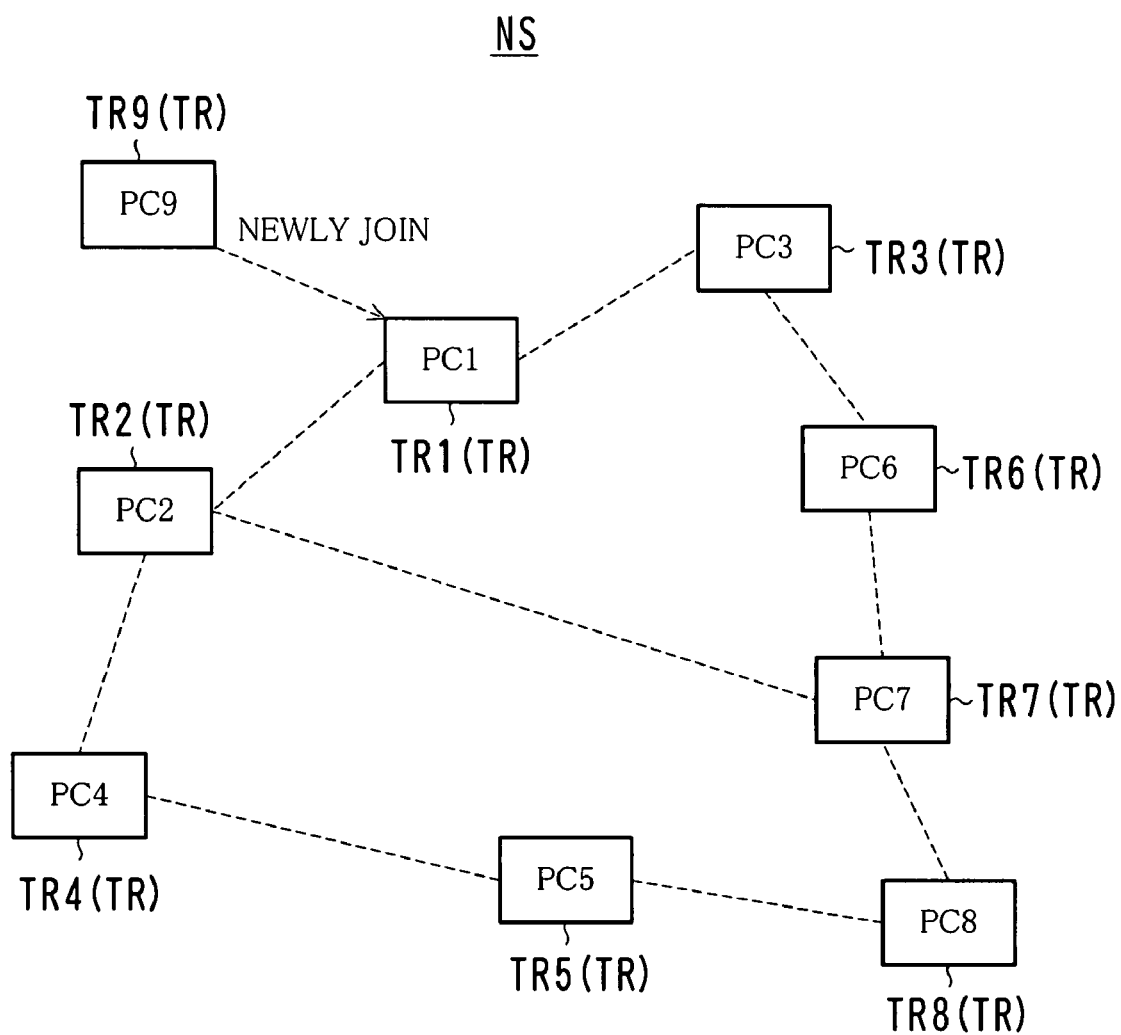
FIG. 4 is a diagram showing an example of the relationship among nodes making up a network.

Referring to FIG. 4, the personal computers TR1, TR2, . . . and the like are assumed to be disposed in a virtual space. As shown by dotted lines, each personal computer TR is associated with at least another adjacent personal computer TR in the virtual space. Moreover, due to these associations, all of the personal computers TR are directly or indirectly related to one another. "Directly related" means the state of being connected by one dotted line in FIG. 4 (for example, the relationship between the personal computer TR3 and the personal computer TR6), and "indirectly related" means the state of being connected by at least two dotted lines and one or more nodes (for example, the relationship between the personal computer TR1 and the personal computer TR8). Two of the personal computers TR that are directly related trust each other. Note that a personal computer TR9 will be described later.

The personal computer TR can exchange data with other personal computer TR with which the personal computer TR itself is associated. Further, the personal computer TR can exchange data with other personal computer TR with which the personal computer TR itself is indirectly associated through one or more personal computers TR disposed therebetween. Furthermore, the personal computers TR that are indirectly associated with each other notify each other of the respective node IDs, MAC addresses and IP addresses. Thereby, the personal computers TR can be newly associated with each other, enabling data exchange.

Referring back to FIG. 1, the manufacturer Y has a first certificate organization C1 and a second certificate organization C2 as authorities for issuing a digital certificate (Certificate Authorities). The first certificate organization C1 operates provisional authentication servers 1A, 2A and 3A, while the second certificate organization C2 operates formal authentication servers 1B, 2B and 3B.

The formal authentication servers 1B, 2B and 3B have the same configuration and perform a process for issuing, via the wide area communication line WNT, i.e., online, a device certificate to the personal computer TR that the manufacturer Y sold to a customer, e.g., the company X. Note that although each of the formal authentication servers 1B, 2B and 3B is associated with each of the personal computers TR, a description is given below of an example in which the formal authentication server 1B is used.

In contrast, the provisional authentication servers 1A, 2A and 3A have the same configuration and perform a process for issuing, to a personal computer TR to be carried to a customer, a digital certificate that proves the identity of the personal computer TR, e.g., a manufacturer or a distribution source thereof. This digital certificate is used as a temporary (provisional) device certificate, until the formal authentication server 1B issues a device certificate of the personal computer TR itself to the personal computer TR. Hereinafter, a digital certificate issued by any of the provisional authentication servers 1A, 2A and 3A is sometimes referred to as a "provisional certificate 5". A device certificate issued by any of the formal authentication servers 1B, 2B and 3B is sometimes referred to as a "formal certificate 6". Note that although the provisional authentication servers 1A, 2A and 3A all issue a provisional certificate 5 to the respective personal computers TR, a description is given below of an example in which the provisional authentication server 1A is used.

As described earlier, the formal authentication server 1B joins the network NS. Accordingly, the personal computer TR can access the formal authentication server 1B online. The provisional authentication server 1A, however, does not join the network NS. Accordingly, the provisional authentication server 1A and the personal computer TR perform communication with each other via an input/output interface such as USB or RS-232C. They may perform communication with each other via a closed communication line of the manufacturer Y, e.g., a LAN line disconnected from the external network. Alternatively, they may exchange data through a removable disk such as a USB memory, a flash memory or a floppy disk. As described later, however, the provisional authentication servers 1A, 2A and 3A join an experimental network TNS that is different from the network NS and is a network as a trial provided by the manufacturer Y.

Further, each of the first certificate organization C1 and the second certificate organization C2 issues a root certificate thereof. Hereinafter, a root certificate of the first certificate organization C1 and a root certificate of the second certificate organization C2 are referred to as a "root certificate 8A" and a "root certificate 8B" respectively. The root certificate 8A includes a public key 8Ak of the first certificate organization C1 and has a digital signature executed by using a private key 8Ah of the first certificate organization C1. The root certificate 8B includes a public key 8Bk of the second certificate organization C2 and has a digital signature executed by using a private key 8Bh of the second certificate organization C2.

Furthermore, the first certificate organization C1 issues to the provisional authentication server 1A a device certificate of the provisional authentication server 1A (hereinafter such a device certificate is referred to as a "server certificate 7A"). The server certificate 7A includes a public key 7Ak of the provisional authentication server 1A. At this time, the private key 8Ah of the root certificate 8A is used to execute a digital signature on the server certificate 7A. Likewise, the second certificate organization C2 issues to the formal authentication server 1B a device certificate of the formal authentication server 1B (hereinafter such a device certificate is referred to as a "server certificate 7B"). The server certificate 7B has a digital signature executed by using the private key 8Bh of the root certificate 8B. The server certificate 7B includes a public key 7Bk of the formal authentication server 1B.

Figure 5:
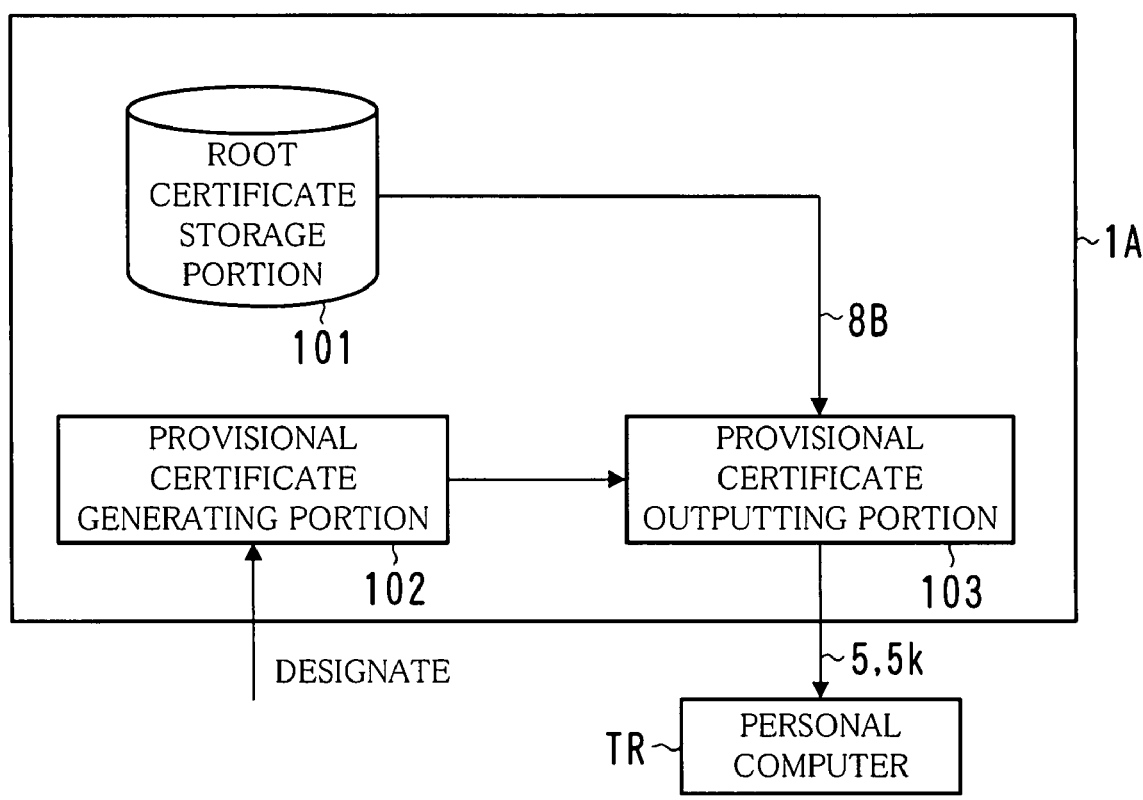
FIG. 5 is a diagram showing an example of a functional configuration of a provisional authentication server.
Figure 6:
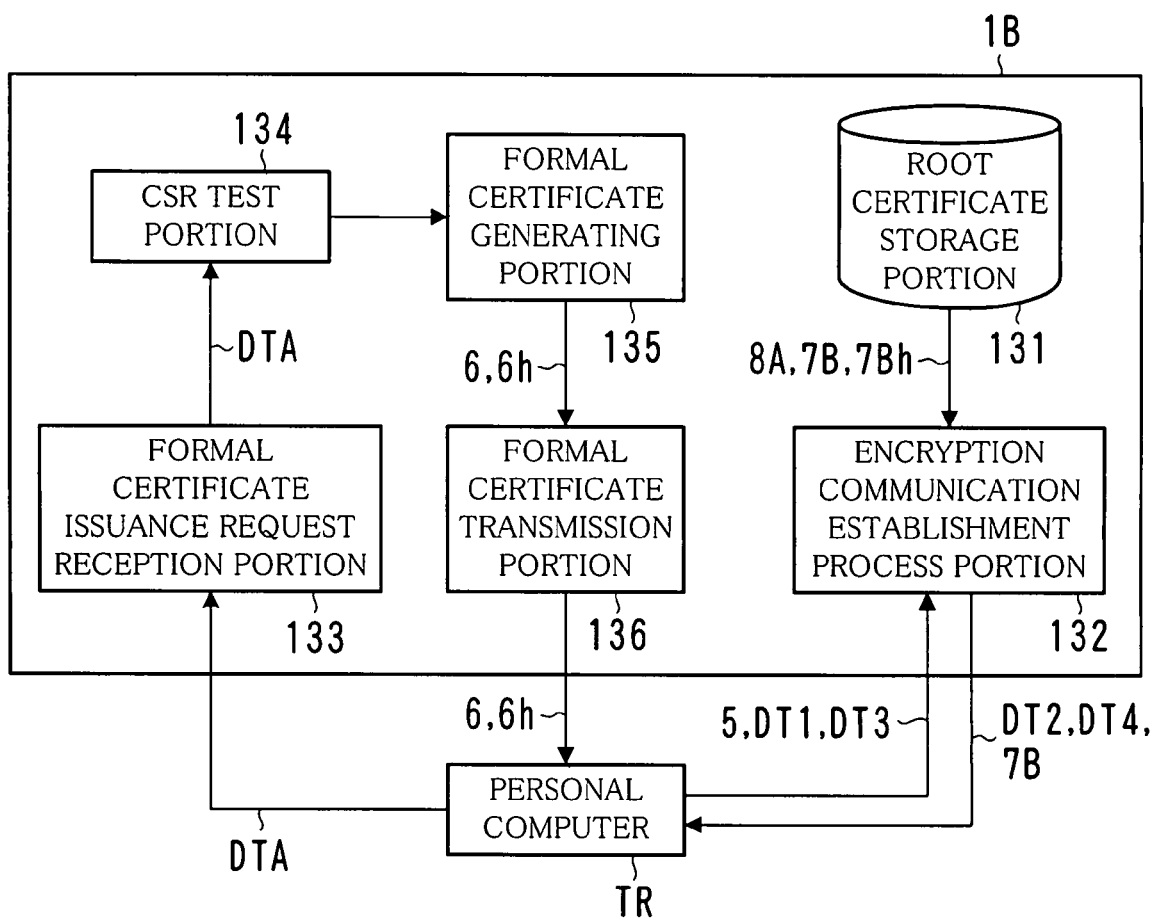
FIG. 6 is a diagram showing an example of a functional configuration of a formal authentication server.

The hardware configuration of each of the provisional authentication server 1A and the formal authentication server 1B is basically the same as that of the personal computer TR shown in FIG. 2. As shown in FIG. 5, however, on a hard disk drive of the provisional authentication server 1A are stored programs and data for implementing functions including a root certificate storage portion 101, a provisional certificate generating portion 102 and a provisional certificate outputting portion 103. Referring to FIG. 6, on a hard disk drive of the formal authentication server 1B are stored programs and data for implementing functions including a root certificate storage portion 131, an encryption communication establishment process portion 132, a formal certificate issuance request reception portion 133, a CSR test portion 134, a formal certificate generating portion 135 and a formal certificate transmission portion 136.

Various types of the certificates described above can be, for example, X. 509 digital certificates recommended by International Telecommunications Union-Telecommunication Standardization Sector (ITU-T). In other words, the digital certificates indicate that a public key unique to that device is authentic and have a digital signature executed by a Certificate Authority or an authentication server. As for authentication using digital certificates, "Internet X.509 Public Key Infrastructure Certificate and CRL Profile", Internet Engineering Task Force Request for Comments (IETF RFC) 2459 should be referred to.

The following is a detailed description of the process details of each portion of the personal computer TR shown in FIG. 3, each portion of the provisional authentication server 1A shown in FIG. 5 and each portion of the formal authentication server 1B shown in FIG. 6.

Referring to FIG. 5, the root certificate storage portion 101 of the provisional authentication server 1A stores the root certificate 8A, the root certificate 8B, the server certificate 7A, a private key 7Ah making a pair with the public key 7Ak included in the server certificate 7A, and the like.

The provisional certificate generating portion 102 generates a provisional certificate 5 of the personal computer TR, for example, according to the following procedure.

The provisional certificate generating portion 102 prepares a pair of a public key 5k and a private key 5h, data indicating a serial number, a registration date (generation date and effective date), a validity period and others of the provisional certificate 5 and data indicating a manufacturer name, a domain name and others of the manufacturer Y. The serial number is assigned in order to prevent duplication of serial numbers of other provisional certificates 5 that were generated in the past. The validity period is determined based on a predetermined rule.

Such data is organized into a predetermined format and a request is made to the first certificate organization C1 to execute a digital signature. In response, the first certificate organization C1 uses a private key thereof to execute a digital signature on the data. In this way, the provisional certificate 5 is generated. The provisional authentication server 1A may execute a digital signature using the private key 7Ah instead of the first certificate organization C1.

The provisional certificate outputting portion 103 outputs the provisional certificate 5 generated using the root certificate 8B by the provisional certificate generating portion 102 to the personal computer TR via an interface such as USB. Before or after the output of the provisional certificate 5, the private key 5h prepared in advance is stored in the personal computer TR. The provisional certificate 5 and the private key 5h are shared by a plurality of the personal computers TR.

Referring to FIG. 6, the root certificate storage portion 131 of the formal authentication server 1B stores the root certificate 8A, the root certificate 8B, the server certificate 7B, a private key 7Bh making a pair with the public key 7Bk of the server certificate 7B, and the like.

The encryption communication establishment process portion 132 performs a process of establishing a connection for performing encryption communication with the personal computer TR. The details of this process will be described later with reference to FIG. 8.

The formal certificate issuance request reception portion 133 accepts a request for issuance of a formal certificate 6 from the personal computer TR. The CSR test portion 134, the formal certificate generating portion 135 and the formal certificate transmission portion 136 perform a process for issuing the formal certificate 6 of the personal computer TR that is the request source. The process details of the formal certificate issuance request reception portion 133 through the formal certificate transmission portion 136 will be described later.

Referring to FIG. 3, the connection table managing portion 2K1 of the personal computer TR stores and manages a connection table TL in which node data DTN is stored for each of other personal computers TR that are associated with the personal computer TR itself. For example, the connection table managing portions 2K1 of the personal computers TR1, TR2 and TR3 store and manage connection tables TL1, TL2 and TL3 shown in FIGS. 7A-7C respectively.

The contents of the connection tables TL are created in advance by an administrator before the beginning of the operation of that personal computer TR. After the beginning of the operation, the contents of the connection table TL are automatically updated in accordance with change in associations of that personal computer TR itself with other personal computers TR.

The node data DTN indicates information on, for example, a node ID, an IP address and a MAC address for identifying that other personal computer TR.

Further, the connection table managing portion 2K1 stores node data DTN of the personal computer TR itself.

The common data storage portion 2K2 stores data to be shared with other personal computers TR (hereinafter such data is referred to as "common data") on a file basis.

The certificate managing portion 2K3 stores and manages the root certificate 8B, the provisional certificate 5 and the private key 5h corresponding to the public key 5k included in the provisional certificate 5. The root certificate 8B and the provisional certificate 5 are input from the provisional authentication server 1A. In addition, the certificate managing portion 2K3 stores and manages the formal certificate 6 received from the formal authentication server 1B and a private key 6h corresponding to a public key 6k included in the formal certificate 6. As described later, the provisional certificate 5 and the private key 5h may be discarded after obtaining the formal certificate 6.

The data generating portion 201 generates data to be sent to other personal computer TR, the provisional authentication server 1A or the formal authentication server 1B.

For example, the data generating portion 201 generates data for requesting other personal computer TR to perform authentication when the personal computer TR itself is to join the network NS for the first time, when the personal computer TR itself is to join the network NS again by starting an Operating System (OS) again or turning on the power again, or when the personal computer TR itself is to join the network NS again after cutting off the communication. Further, when authentication is requested from other personal computer TR that is to join the network NS from now, the data generating portion 201 generates data to be exchanged with that other personal computer TR. Furthermore, the data generating portion 201 generates data for requesting the formal authentication server 1B to issue a formal certificate 6 of the personal computer TR itself.

The data transmission portion 202 converts various types of data generated by the data generating portion 201 into packets and sends the same to a destination device.

The data reception portion 203 receives packets that have been sent to the personal computer TR itself among the packets flowing through the communication line. Then, the data reception portion 203 combines the received packets or others to reproduce the original data.

The data analysis portion 204 extracts necessary information from the data received by the data reception portion 203 to analyze the contents thereof. Then, the data analysis portion 204 determines a type of the data. In accordance with the determination result, the authentication process portion 213, the common data operating portion 214 and others perform predetermined processes based on the data. The details of the processes will be described later.

Before the personal computer TR itself is newly added to the network NS and the operation of the personal computer TR is started, the formal certificate issuance requesting portion 211 performs a process for requesting a formal certificate 6 of the personal computer TR itself to the formal authentication server 1B. Such a process is performed, for example, according to the procedure shown in FIG. 8.

If the personal computer TR itself is connected to the hub DH and a predetermined command is entered, then the formal certificate issuance requesting portion 211 instructs the data generating portion 201 and the data transmission portion 202 to generate data for requesting a connection to the formal authentication server 1B and send the generated data to the formal authentication server 1B.

Figure 8:
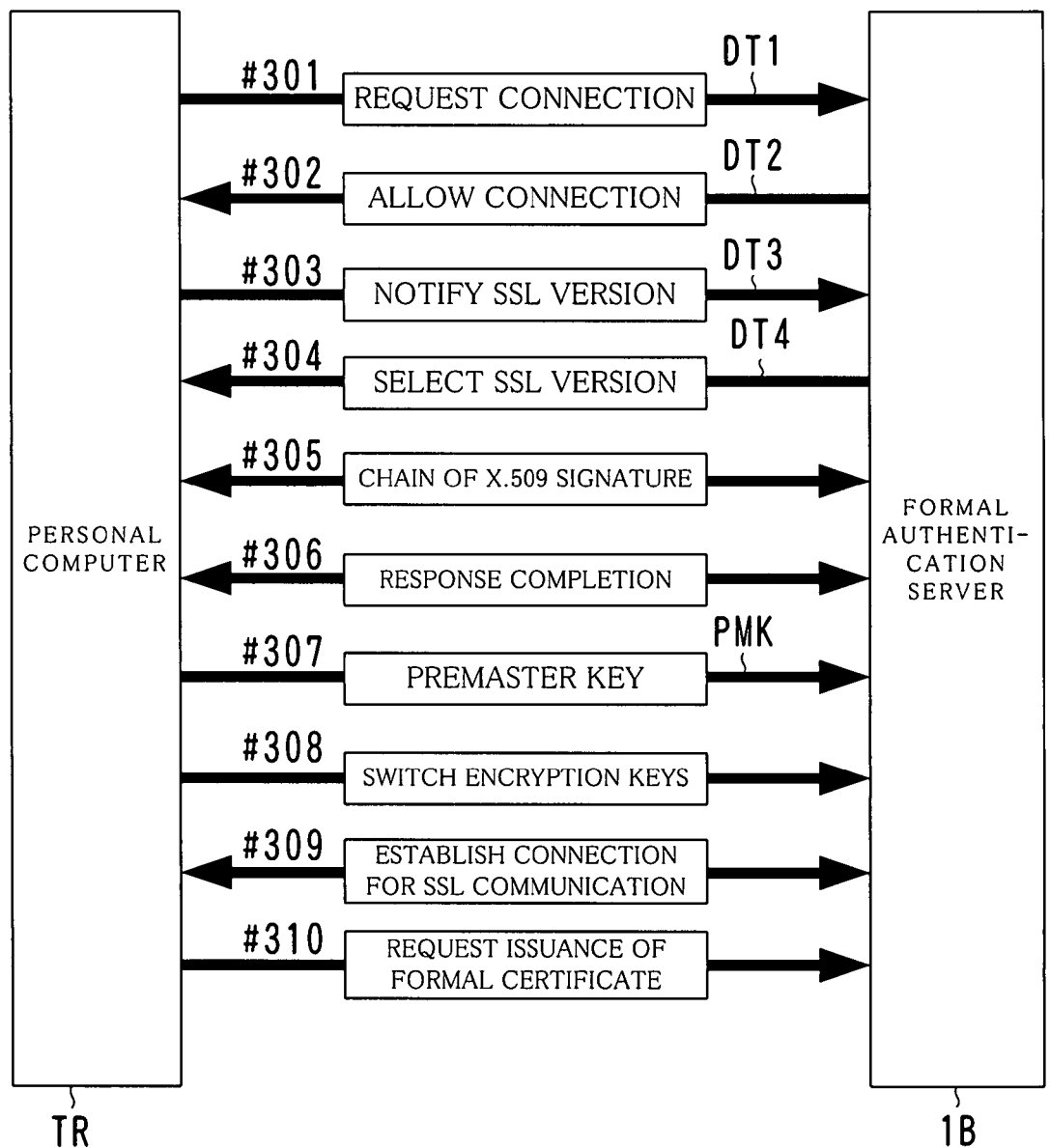
FIG. 8 is a flowchart showing an example of a process of establishing an SSL connection between a personal computer and a formal authentication server.

In response, the data generating portion 201 generates data for connection request (hereinafter referred to as "connection request data DT1"), and the data transmission portion 202 sends the connection request data DT1 to the formal authentication server 1B (#301 in FIG. 8).

When receiving the connection request data DT1, the formal authentication server 1B generates connection permission data DT2 indicating that the connection is allowed and sends the generated data to the personal computer TR that is the request source (#302).

In the personal computer TR, if the data reception portion 203 receives the connection permission data DT2 and performs a predetermined process, then the personal computer TR and the formal authentication server 1B are connected to each other. At this time point, however, since the connection for Secure Sockets Layer (SSL) communication has not been established yet, communication security is not ensured. Accordingly, the following process (handshaking) is performed. As for the details of SSL, "The TLS Protocol Version 1.0", Internet Engineering Task Force Request for Comments (IETF RFC) 2246 and "The SSL Protocol Version 3.0", INTERNET-DRAFT should be referred to.

The data generating portion 201 of the personal computer TR generates SSL version data DT3 indicating supportable SSL versions, and the data transmission portion 202 sends the SSL version data DT3 to the formal authentication server 1B (#303).

Responding to this, the formal authentication server 1B selects one version that can be supported by the formal authentication server 1B from among the versions indicated in the SSL version data DT3 to generate SSL version selection data DT4 indicating the selected version. Then, the generated data is sent to the personal computer TR (#304).

In the personal computer TR, if the data reception portion 203 receives the SSL version selection data DT4 sent by the formal authentication server 1B, then it is determined that the SSL version indicated therein is adopted as a protocol for desired communication. Likewise, the similar determination is made in the formal authentication server 1B.

The personal computer TR and the formal authentication server 1B perform a process regarding a chain of X.509 signature individually and exchange the device certificates with each other or the like. Thereby, each of the personal computer TR and the formal authentication server 1B performs authentication of the other end (#305).

More specifically, the personal computer TR obtains from the formal authentication server 1B the server certificate 7B and data that is encrypted using the private key 7Bh, i.e., data on which a digital signature is executed. Then, the personal computer TR performs an authentication process of the formal authentication server 1B based on the data, the public key 8Bk of the second certificate organization C2 included in the root certificate 8B and others. In other words, since the digital signature is executed on the server certificate 7B using the private key 8Bh of the second certificate organization C2, the verification is performed using the public key 8Bk included in the root certificate 8B. Further, the personal computer TR examines whether or not the other end of the current communication is a fraudulent device that masquerades as the formal authentication server 1B. Further, the personal computer TR examines whether the formal authentication server 1B is a device that is verified by the second certificate organization C2.

Likewise, the formal authentication server 1B obtains the device certificate from the personal computer TR. Then, the formal authentication server 1B performs an authentication process of the personal computer TR based on the device certificate, the root certificate 8A and others. However, since a formal certificate 6 has not been issued to the personal computer TR yet, the provisional certificate 5 is obtained and used as the device certificate. In other words, since a digital signature is executed on the provisional certificate 5 obtained from the personal computer TR using the private key 8Ah of the first certificate organization C1, the verification is performed using the public key 8Ak included in the root certificate 8A. Further, it is examined whether the personal computer TR is a device that is verified by the first certificate organization C1.

When completing the authentication process of the other end of the communication, each of the personal computer TR and the formal authentication server 1B notifies the other end of the process completion (#306).

After verifying the authenticity of each other, either one of the personal computer TR and the formal authentication server 1B creates a premaster key PMK that is an arbitrary value with 384 bits in order to create a common key to be used for the SSL communication by the personal computer TR and the formal authentication server 1B. Here, assume that the personal computer TR creates such a premaster key PMK. The data generating portion 201 of the personal computer TR uses the public key 7Bk of the server certificate 7B of the formal authentication server 1B to encrypt the premaster key PMK and sends the encrypted premaster key PMK to the formal authentication server 1B (#307). Further, the data generating portion 201 of the personal computer TR sends to the formal authentication server 1B instructions to the effect that a common key should be created and the encryption key for communication should be switched to the common key (#308).

When receiving the premaster key PMK, the formal authentication server 1B uses the private key 7Bh corresponding to the server certificate 7B to decode the premaster key PMK. Then, the formal authentication server 1B uses the received premaster key PMK to create a common key KYP and performs a control process so that encryption communication using the common key KYP is performed with the personal computer TR in the future. In short, the encryption keys are switched.

Likewise, the personal computer TR uses the premaster key PMK that has been sent to the formal authentication server 1B to create a common key KYP and performs a control process so that encryption communication using the common key KYP is performed with the formal authentication server 1B in the future. In other words, the encryption keys are switched. Note that the personal computer TR and the formal authentication server 1B use the same function that is confirmed in advance by selection of the SSL version or others to create the common key KYP individually. Thus, it is a matter of course that the common keys KYP created respectively by the formal authentication server 1B and the personal computer TR are the same.

With the processes described above, the connection for the SSL communication is established between the personal computer TR and the formal authentication server 1B (#309). This enables the personal computer TR to safely perform the communication necessary to have a formal certificate 6 issued.

Then, the formal certificate issuance requesting portion 211 requests the formal authentication server 1B to issue a formal certificate 6 (#310). In short, the formal certificate issuance requesting portion 211 performs a Certificate Signing Request (CSR) process. Such a request is made according to the following procedure.

The formal certificate issuance requesting portion 211 generates a pair of the public key 6k and the private key 6h. At this time, the public key 6k and the private key 6h are preferably generated using identification information, e.g., a MAC address of the personal computer TR itself in order to prevent duplication of public keys 6k and private keys 6h of other personal computers TR.

Further, the formal certificate issuance requesting portion 211 instructs the data generating portion 201 and the data transmission portion 202 to generate formal certificate issuance request data DTA including a message for requesting issuance of a formal certificate 6, identification information of the personal computer TR itself and the generated public key 6k, and to send the generated formal certificate issuance request data DTA to the formal authentication server 1B.

If the authentication fails, then execution of the process of Step #310 is stopped.

Referring to FIG. 6, the formal certificate issuance request reception portion 133 of the formal authentication server 1B receives the formal certificate issuance request data DTA sent from the personal computer TR and thereby to accept the request for issuance of a formal certificate 6.

The CSR test portion 134 examines the formal certificate issuance request data DTA received by the formal certificate issuance request reception portion 133, that is, examines the CSR. At this time, the CSR test portion 134 checks identification information (or serial name) and others indicated in the formal certificate issuance request data DTA. Alternatively, the CSR test portion 134 may request the personal computer TR to specify a predetermined password and then to check the password. Then, only in the case where the password is correct, a process for generating a formal certificate 6, which will be described next, may be started. The password check process may be performed when a provisional certificate 5 is issued by the provisional authentication server 1A.

As a result of the examination with the CSR test portion 134, if no problem is seen in the formal certificate issuance request data DTA, then the formal certificate generating portion 135 generates a formal certificate 6 based on the formal certificate issuance request data DTA, for example, according to the following procedure.

The formal certificate generating portion 135 prepares data that is to become the contents of the formal certificate 6, e.g., data indicating a public key 6k, a serial number, a registration date (generation date and effective date), a validity period and others of the formal certificate 6. The serial number is assigned in order to prevent duplication of serial numbers of other formal certificates 6 that were generated in the past. The validity period is determined based on a predetermined rule. The public key 6k is included in the formal certificate issuance request data DTA.

Such data is organized into a predetermined format and a request is made to the second certificate organization C2 to execute a digital signature. In response, the second certificate organization C2 uses a private key thereof to execute a digital signature on the data. In this way, the formal certificate 6 is generated. The formal authentication server 1B may execute a digital signature instead of the second certificate organization C2.

The formal certificate transmission portion 136 sends the formal certificate 6 generated by the formal certificate generating portion 135 to the personal computer TR as the request source.

In the personal computer TR, the formal certificate 6 is received by the data reception portion 203 (see FIG. 3) and stored and managed by the certificate managing portion 2K3. With the processes described above, the issuance is completed of the formal certificate 6 that is an official device certificate of the personal computer TR.

The application process portion 212 performs a process for applying to (requesting) any of other personal computers TR registered in the connection table TL of that personal computer TR to perform node authentication or user authentication of that personal computer TR, when the personal computer TR itself joins the network NS, for example, when the power is turned on, when an operating system is started again, or when the state is switched from "offline" to "online". Further, when the personal computer TR itself is to leave the network NS, the application process portion 212 performs a process for applying to other personal computer TR to that effect.

The authentication process portion 213 performs node authentication or user authentication requested by other personal computer TR.

Figure 9:
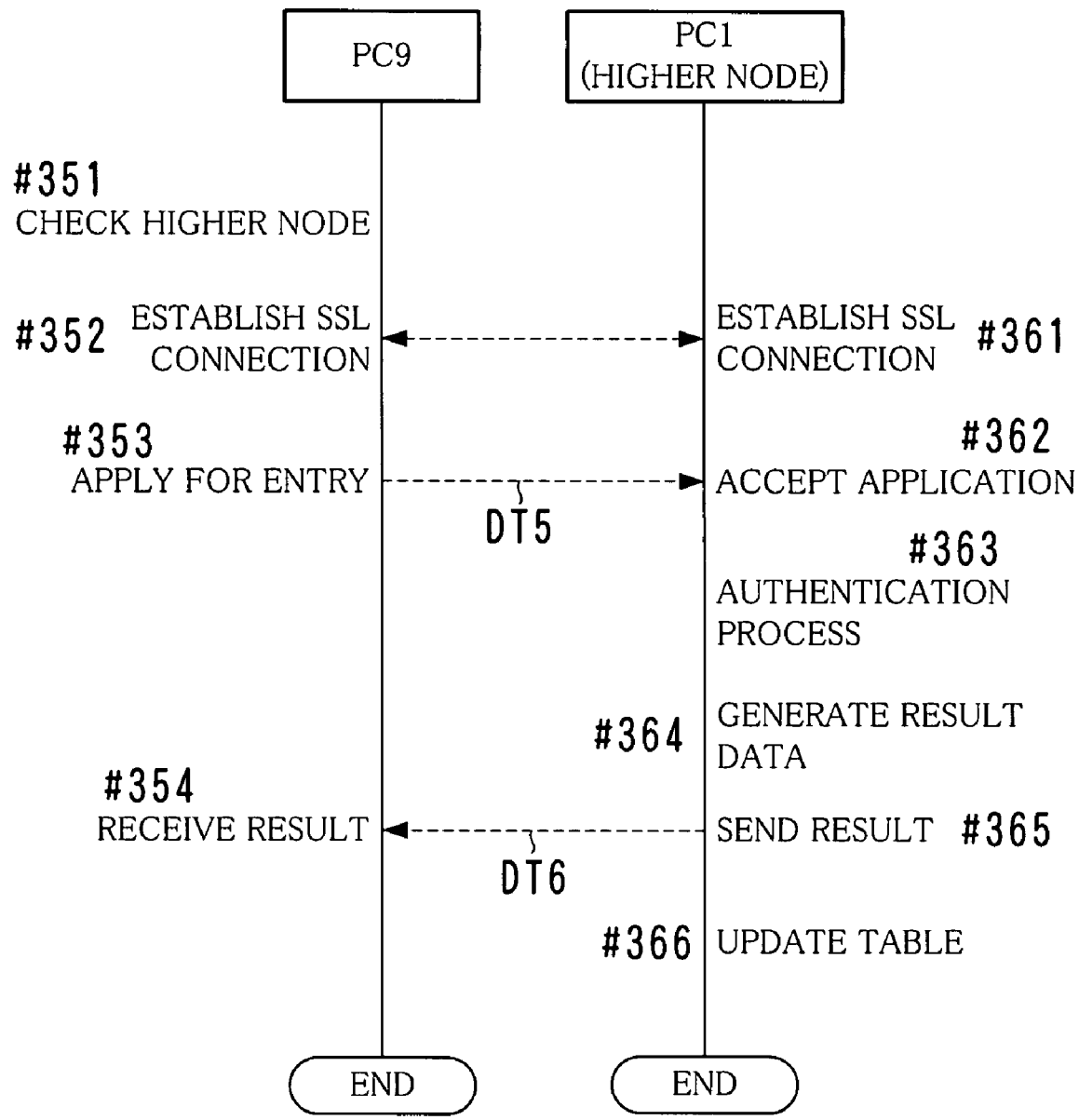
FIG. 9 is a flowchart showing an example of a process of communication between personal computers.

The following is a description, with reference to the flowchart shown in FIG. 9 or others, of a process procedure of the application process portion 212 and the authentication process portion 213 in the case where, as shown in FIG. 4, the personal computer TR9 is to newly join the network NS where the personal computers TR1-TR8 have already joined, and in the case where the personal computer TR9 is to leave the network NS.

In the personal computer TR9, the application process portion 212 checks the connection table TL of the personal computer TR9 itself (#351 in FIG. 9) and performs an SSL connection to higher nodes (personal computers TR) associated with the personal computer TR9 itself (#352). Hereinafter, a description is provided assuming that the connection table TL9 of the personal computer TR9 stores node data DTN of the personal computer TR1 as shown in FIG. 10. Accordingly, here, the personal computer TR9 is connected to the personal computer TR1 (#361).

Figure 11:
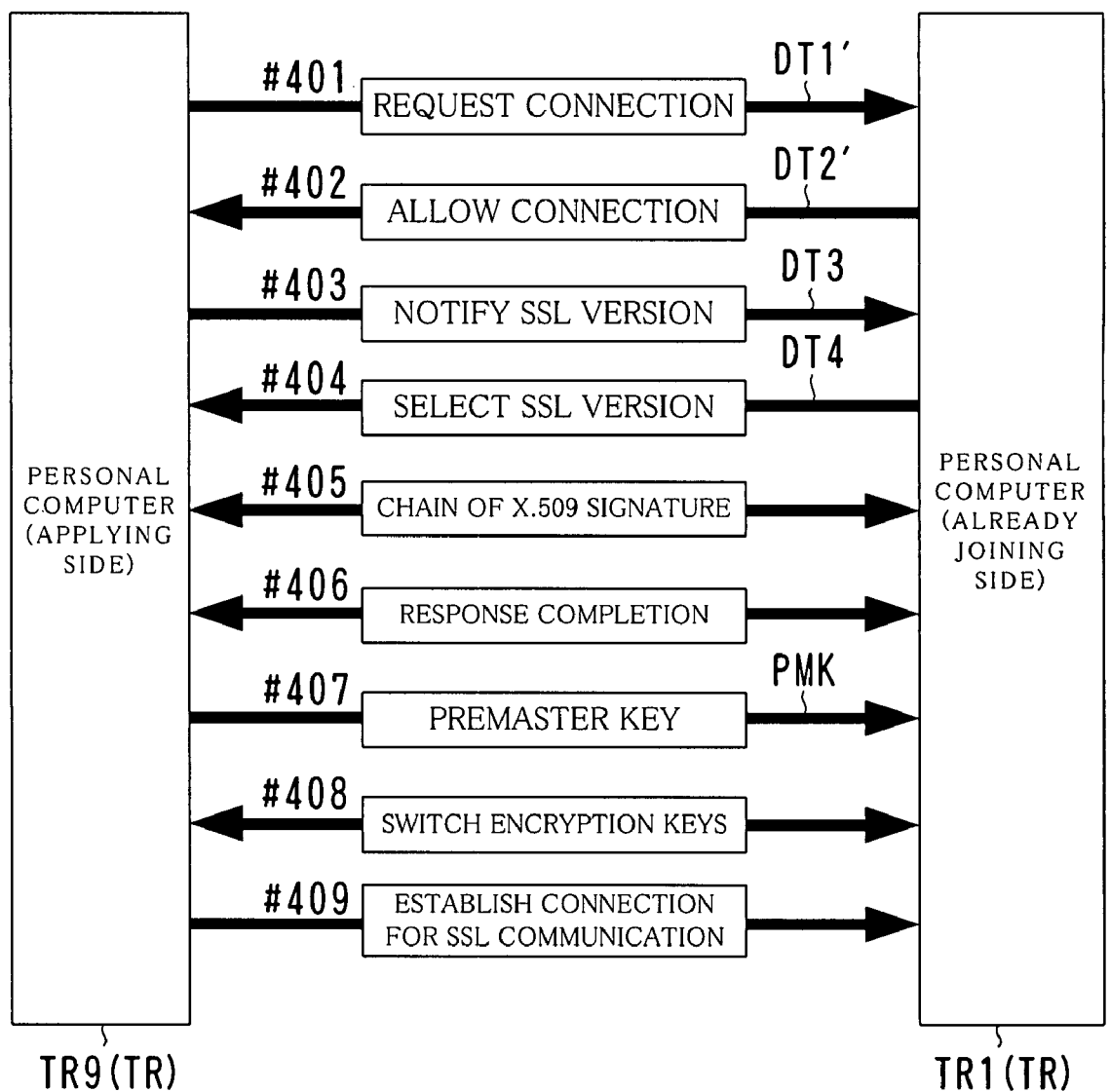
FIG. 11 is a flowchart showing an example of a process of establishing an SSL connection between personal computers.

The connection procedure using SSL is as shown in FIG. 11. This procedure is basically the same as that of the connection process using SSL between the personal computer TR and the formal authentication server 1B described earlier with reference to Step #303 through Step #309 in FIG. 8. Since, however, the personal computers TR1 and TR9 have their own official device certificates, i.e., formal certificates 6 respectively, they use the formal certificates 6 to perform authentication of each other and establish a connection for SSL communication.

The connection table TL of the personal computer TR9 still has information (node data DTN) of the other end of the connection when the personal computer 9 joined the network NS the last time. If the personal computer TR9 has never joined the network NS, then the personal computer TR9 is associated with any of the existing personal computers TR (nodes) in advance and an administrator registers information on the node in the connection table TL of the personal computer TR9.

When the connection to the personal computer TR1 is established, the application process portion 212 instructs the data generating portion 201 and the data transmission portion 202 to generate entry application data DT5 indicating a node ID, an IP address and a MAC address of the personal computer TR9 itself, a user ID and a password of a user, and a message to the effect that the personal computer TR9 desires to join the network NS, and to send the generated entry application data DT5 to the personal computer TR1. Thereby, application for entry into the network NS is performed (#353).

In the personal computer TR1, when the entry application data DT5 is received (#362), the authentication process portion 213 performs node authentication or user authentication based on the entry application data DT5 (#363). The formal certificate 6 is used for this authentication process.

As a result of the node authentication or the user authentication, when it can be confirmed that the personal computer TR9 is appropriate as a node in the network NS, the authentication process portion 213 instructs the data generating portion 201 and the data transmission portion 202 to generate authentication result data DT6 indicating a message to the effect that the authenticity is verified, and send the generated authentication result data DT6 to the personal computer TR9. In this way, the personal computer TR9 is informed of the authentication result (#364 and #365).

Further, in parallel with or before or after the process of Step #364 and Step #365, the connection table managing portion 2K1 newly registers node data DTN of the personal computer TR9 in the connection table TL1 of the personal computer TR1 itself (#366).

With the processes described above, as shown in FIG. 12, the personal computer TR9 can join the network NS. After that, the personal computer TR9 can be associated with nodes other than the personal computer TR1 through the personal computer TR1 or others by notifying each other of the node data DTN.

However, the authentication process portion 213 denies authentication based on the root certificate 8A and the provisional certificate 5. Accordingly, even if application for entry is made from a personal computer TR to which only the provisional certificate 5 is issued, e.g., a personal computer TR10 in FIG. 12, such application for entry is denied.

If the personal computer TR9 leaves the network NS, then the application process portion 212 instructs the data generating portion 201 and the data transmission portion 202 to generate withdrawal application data DT7 indicating that the personal computer TR9 leaves the network NS, and send the generated withdrawal application data DT7 to each node (personal computer TR) indicated in the connection table TL9 of the personal computer TR9 itself.

In response, in the personal computer TR that has received the withdrawal application data DT7 (the personal computer TR1 in the example shown in FIG. 12), the node data DTN of the personal computer TR9 is deleted from the connection table TL thereof.

The common data operating portion 214 performs a process regarding common data stored in the common data storage portion 2K2 of that personal computer TR, based on a request made by a user of that personal computer TR itself, i.e., a local user or by other personal computer TR.

For example, in the case where the local user enters a command to open common data using a word processor application, a spreadsheet application or other application, the common data operating portion 214 loads the common data into the RAM 20b. Further, the common data operating portion 214 causes the common data storage portion 2K2 to store common data sent from other personal computer TR. Further, in the case where a request for common data is made by other personal computer TR, the common data operating portion 214 loads the common data into the RAM 20b in order that provision or distribution of the common data to the request source is prepared. Furthermore, the common data operating portion 214 searches common data relating to a keyword designated by the local user or other personal computer TR.

Figure 13:
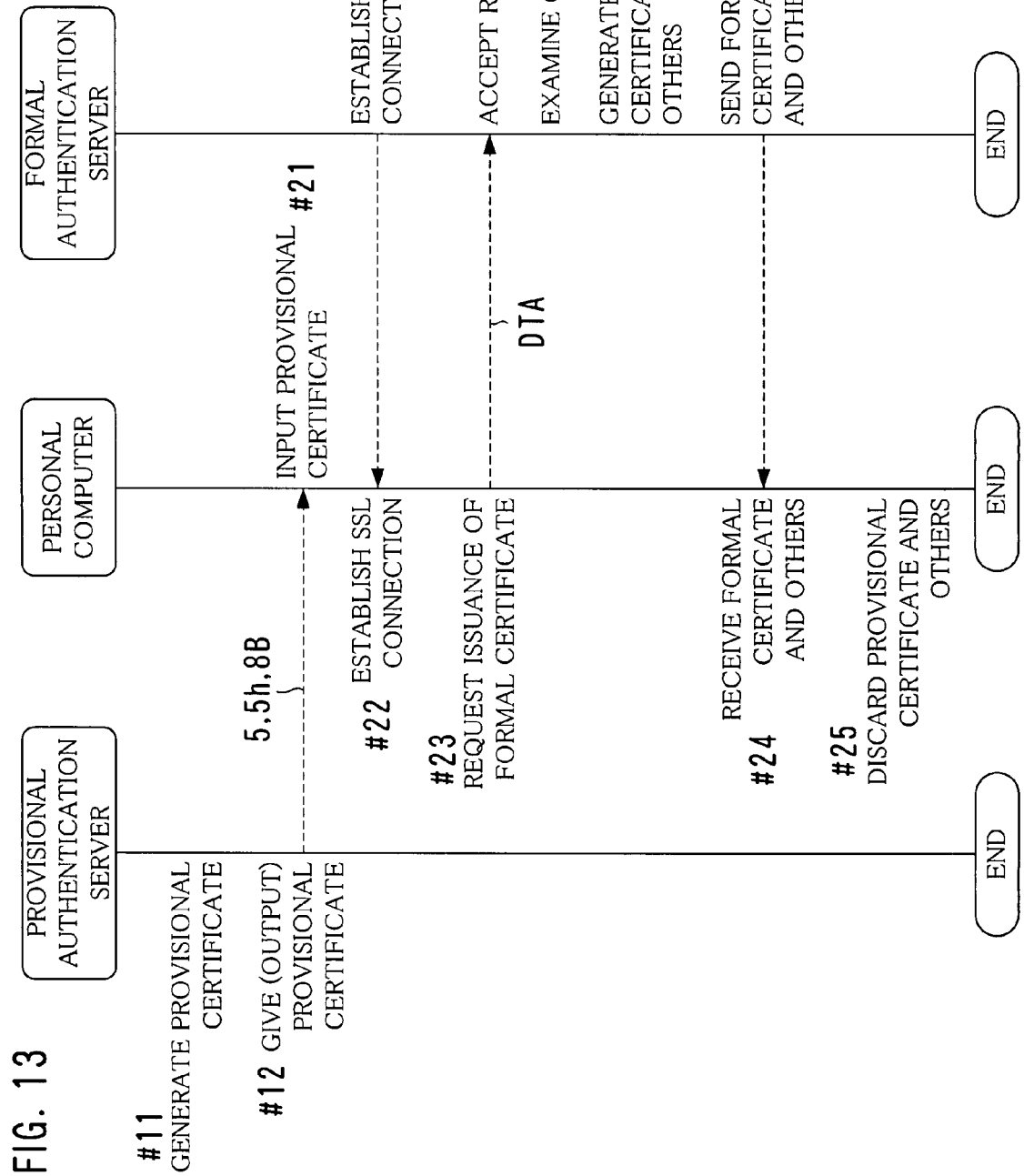
FIG. 13 is a flowchart showing an example of the entire process of a personal computer, a provisional authentication server and a formal authentication server.

Next, a description is provided, with reference to the flowchart shown in FIG. 13, of a process of issuing an official digital certificate unique to each of ten personal computers TR11-TR20 that are newly carried to the company X by the manufacturer Y at the same period.

Referring to FIG. 13, the provisional authentication server 1A of the manufacturer Y generates new provisional certificates 5 (#11) and gives them to the personal computers TR11-TR 20 in common (#12 and #21). The provisional certificate 5 has a digital signature executed by the first certificate organization C1. At this time, the root certificates 8B of the second certificate organization C2 are also given to the personal computers TR11-TR 20. In addition, the private key 5h corresponding to the public key 5k included in each of the provisional certificates 5 is also given to each of the personal computers TR11-TR20.

The manufacture Y carries the personal computers TR11-TR20 on which the provisional certificate 5, the private key 5h and the root certificate 8B are installed to the company X and installs the personal computers TR11-TR20 at predetermined locations. After that, the personal computers TR11-TR20 are connected to a hub DH and are turned ON.

Then, the personal computers TR11-TR20 are connected to the formal authentication server 1B each using SSL (#22 and #31). The connection procedure using SSL is as described earlier with reference to Step #301 through Step #309 in FIG. 8. At this time, the provisional certificate 5 and the server certificate 7B are used. In the case where at least any one of the provisional certificate 5 and the server certificate 7B expires, i.e., in the case where the current date and time does not correspond to the validity period, the connection using SSL ends up in a failure.

Each of the personal computers TR11-TR20 that have succeeded in the connection using SSL generates a unique pair of the public key 6a and the private key 6h and sends the formal certificate issuance request data DTA to the formal authentication server 1B and thereby requests the formal authentication server 1B to issue a formal certificate 6 (#23).

When receiving the request (#32), the formal authentication server 1B examines the CSR (#33). If it can be confirmed that no problem is seen, the formal authentication server 1B generates a unique formal certificate 6 for the request source (#34) and sends the same to the request source (#35 and #24).

Accordingly, in this example, the formal authentication server 1B issues ten formal certificates 6 having different contents.

With the processes described above, a unique formal certificate 6 is issued to each of the personal computers TR11-TR20. After that, the personal computers TR11-TR20 that received the formal certificate 6 discard the provisional certificate 5 and the private key 5h (#25).

Note that the validity period of the provisional certificate 5 is desirably shorter than that of the formal certificate 6. For example, it is desirable that a rule regarding the validity period is so defined that the validity period of the provisional certificate 5 is set to be approximately a few days through one month and the validity period of the formal certificate 6 is set to be approximately one year through a few years. Further, the end of the validity period of the provisional certificate 5 is desirably earlier than that of the formal certificate 6.

In this embodiment, a provisional certificate 5 that is a provisional digital certificate is issued to a personal computer TR in advance, and encryption communication using SSL is realized between the personal computer TR and the formal authentication server 1B based on the provisional certificate 5. Under such a state, the formal authentication server 1B issues a formal certificate 6 that is a formal digital certificate and gives the same to the personal computer TR. Consequently, a digital certificate can be issued easily and safely.

In particular, in the case where the formal certificates 6 are issued, at the same time, to each of the plural personal computers TR used in an organization such as government and corporate office, the provisional certificate 5 is shared, resulting in more efficient issuance of the formal certificates 6.

Specifically, if a service person issues a formal certificate 6 to each personal computer TR in the stage until the personal computers-TR are shipped, it takes a lot of trouble, which is impractical. According to this embodiment, however, a single provisional certificate 5 for proving a manufacturer or a distribution source is given to a plurality of personal computers TR in common. Thereby, after carrying the personal computers TR to predetermined locations, a formal certificate 6 can be issued simply online and safely by encryption communication.

Figure 14:
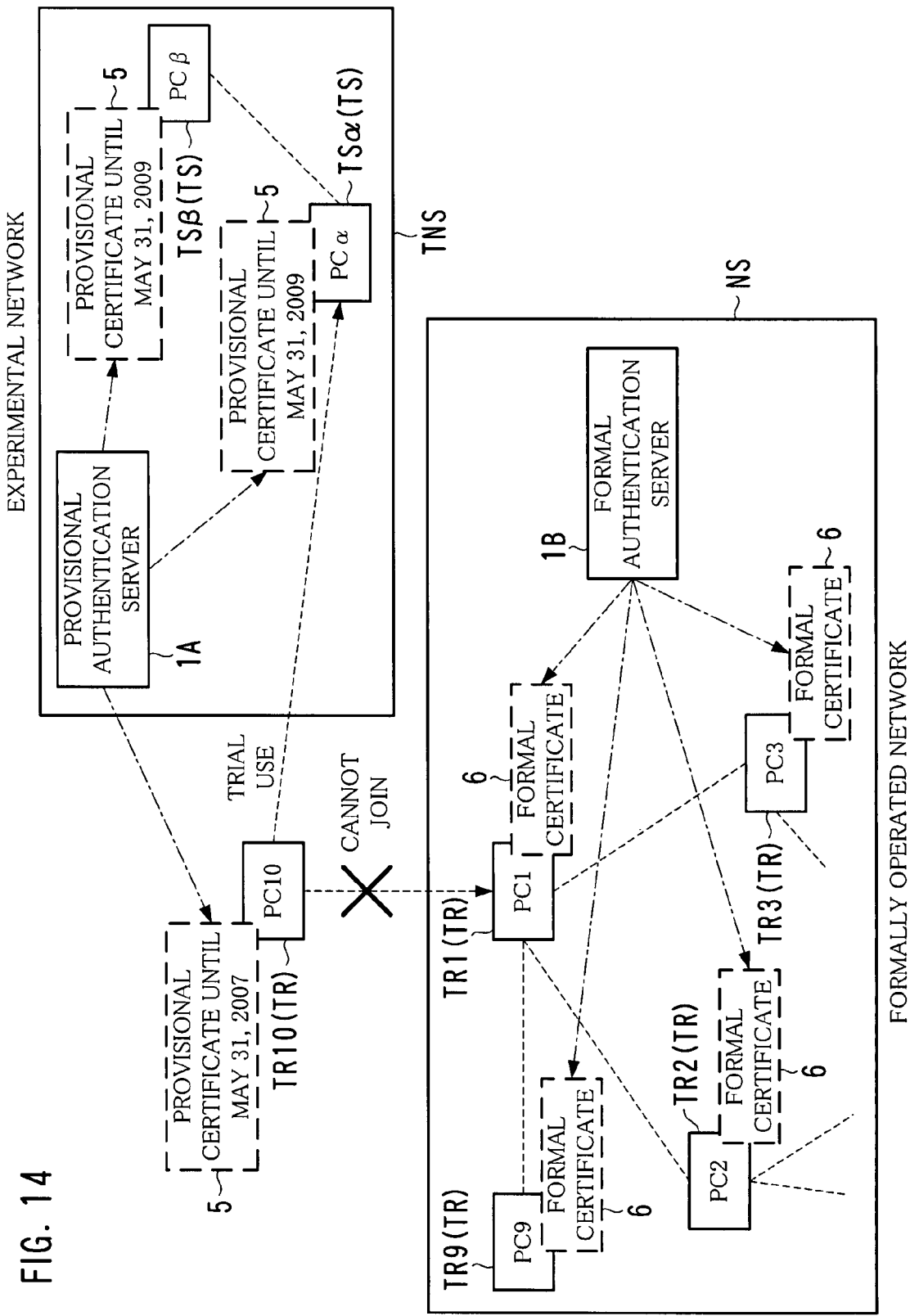
FIG. 14 is a diagram showing an example of an experimental network.

FIG. 14 is a diagram showing an example of the experimental network TNS.

Figure 12:
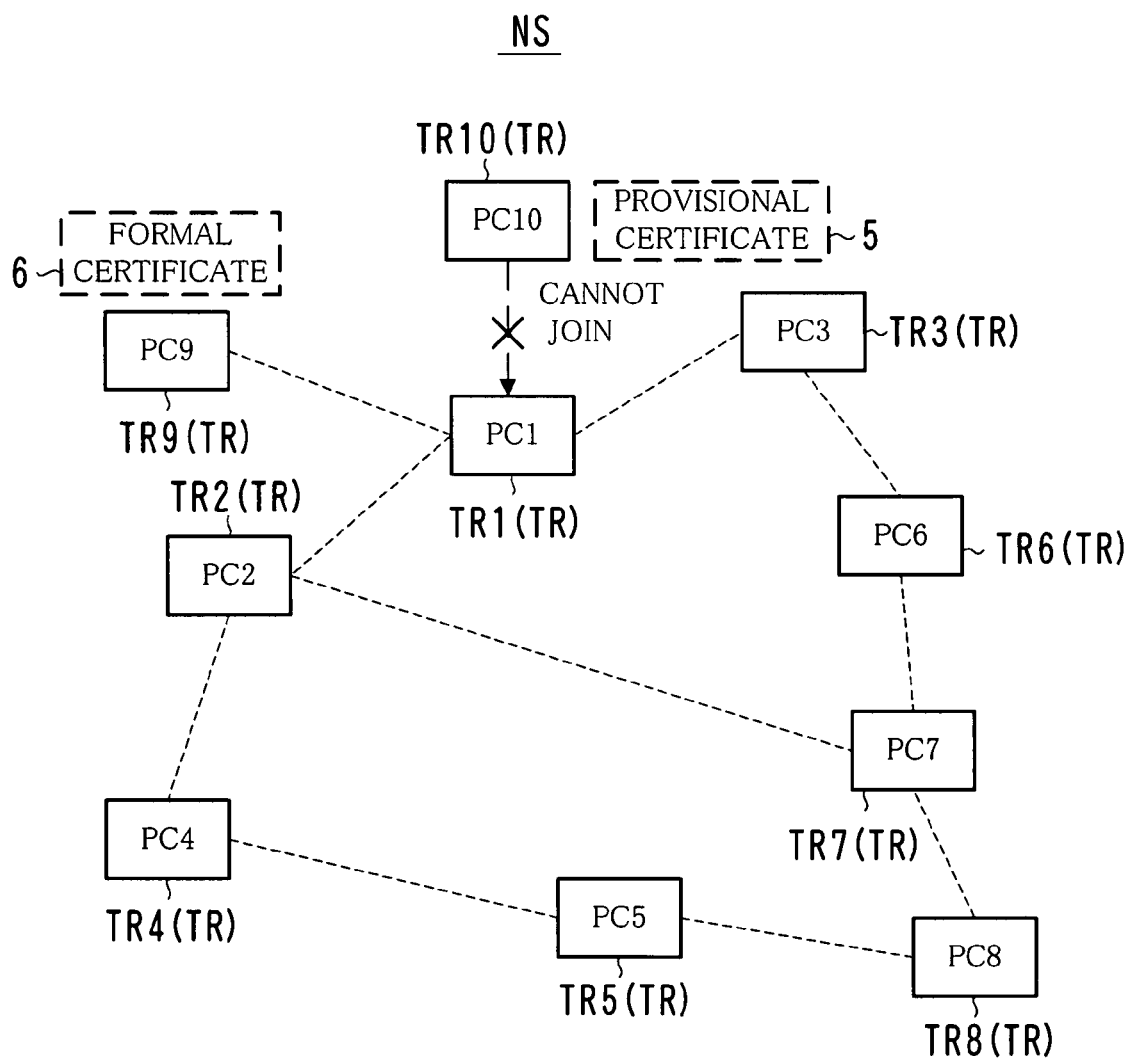
FIG. 12 is a diagram showing an example of the relationship among nodes in a network after a personal computer newly joins the network.

In the example shown in FIG. 12, the personal computer TR10 cannot join the network NS that is formally operated because it has only a provisional certificate 5. However, the personal computer TR10 can join the network NS if it is given a formal certificate 6. In view of these respects, a personal computer TR to be newly incorporated may be handled as follows. The following is a description of a case where the personal computer TR10 is incorporated as the new personal computer TR.

A provisional certificate 5 is given to the personal computer TR10. A formal certificate 6 is not given to it at this moment.

The manufacturer Y prepares in advance the experimental network TNS where a personal computer TR that has only a provisional certificate 5 can join as a trial. As shown in FIG. 14, a plurality of personal computers TS (TSα, TSβ ..., and the like) prepared by the manufacturer Y are caused to join the experimental network TNS.

The personal computers TS have the same hardware and software configuration as the personal computers TR that join the network NS. Note, however, that a provisional certificate 5 is given to the personal computers TS but a formal certificate 6 is not given to the same. This ensures independence of the experimental network TNS and the network NS.

The personal computers TS are used only in the closed experimental network TNS. Accordingly, it is possible to set the end of the validity period of the provisional certificate 5 to be given to the personal computers TS to be later than that of the provisional certificate 5 to be given to the personal computer TR. Alternatively, it is possible to set the validity period of the provisional certificate 5 to be given to the personal computers TS to be an indefinite period.

Further, a connection table is given to each of the personal computers TS. The connection table stores node data of other personal computer TS with which the personal computer TS itself is associated in the experimental network TNS. After joining the experimental network TNS, a similar connection table is given also to the personal computer TR10. The connection table has the same format as the connection table TL described earlier with reference to FIG. 7.

The procedure for the personal computer TS to join the experimental network TNS is similar to the procedure for the personal computer TR to join the network NS formally operated described with reference to FIG. 11. More specifically, the personal computer TS that is to join the experimental network TNS from now may establish a connection for SSL communication with other personal computer TS that has already joined the experimental network TNS according to the procedure described earlier with reference to FIG. 11. However, authentication is performed using not a formal certificate 6 but a provisional certificate 5 here.

A user can put, in the experimental network TNS, also the personal computer TR10 that is given only the provisional certificate 5. Further, the user can operate the personal computer TR10 in the experimental network TNS as a trial.

In the case where the user desires to incorporate the personal computer TR10 into the network NS actually after using the same sufficiently in the experimental network TNS as a trial, the formal authentication server 1B can issue a formal certificate 6 for actual operation.

Note that a validity period can be set for the provisional certificate 5 so that a trial period is limited.

In this way, the experimental network TNS that is completely independent of the network NS is used, allowing for the trial use of the personal computer TR10 on the assumption that the personal computer TR10 is caused to join the network.

During the trial use, it is possible to check whether or not the personal computer TR10 meets a certain standard of security. For example, checks may be performed whether or not it is infected by a virus, whether or not it has a security hole, and whether or not it is altered. Further, if necessary, the safety of the personal computer TR10 may be further improved by, for example, applying a latest system patch to the personal computer TR10 or updating a virus pattern file. These processes enable a user to add the personal computer TR10 to the network NS safely, leading to safe operation of the network NS.

Another configuration is possible in which a new computer TR is always caused to join the experimental network TNS for trial use without exception before causing it to join the network NS formally operated, and is subjected to the security process described above, instead of causing it to join the network NS from the beginning. Then, when it can be confirmed that the new computer TR meets a predetermined standard, a formal certificate 6 is preferably issued to the same, so that the new computer TR is caused to leave the experimental network TNS and to join the network NS. This can keep the entire network NS more clean.

In this embodiment, the description is provided of the case where a personal computer TR is used as a node in the network NS. Instead, however, the present invention can be applied to the case where a formal certificate 6 is issued to a workstation, a Multi Function Peripheral (MFP), a printer, a cellular phone, a mobile computer or various other information processing apparatuses.

In the case where an owner of a personal computer TR is changed, or in the case where a personal computer TR is disposed of, it is desirable to invalidate a formal certificate 6 of the personal computer TR and to discard a private key 6h.

In the case where a private key 5h of a provisional certificate 5 is leaked, it is desirable to invalidate the provisional certificate 5 promptly.

In this embodiment, a personal computer TR generates a public key 6k and a private key 6h and the formal authentication server 1B executes a digital signature on data including the public key 6k, so that a formal certificate 6 is issued. Instead, however, another configuration is possible in which the formal authentication server 1B generates a public key 6k and a private key 6h, issues a formal certificate 6, and sends the private key 6h and the formal certificate 6 to a personal computer TR. The same applies to a public key 5k, a private key 5h and a provisional certificate 5.

In the embodiment described above, the overall configuration of the network NS, the provisional authentication server 1A, the formal authentication server 1B, and the personal computer TR, the configurations of various portions thereof, the details of process, the process order, the structures of the tables, may be changed as needed, in accordance with the subject matter of the present invention.

The embodiment described above discloses the following inventions:

A method for issuing a digital certificate to an information processing apparatus that joins a network, the method including preparing a first digital certificate issuing portion and a second digital certificate issuing portion, causing the first digital certificate issuing portion to perform a process for issuing a first digital certificate that is a provisional digital certificate of the information processing apparatus, establishing a connection for encryption communication between the information processing apparatus and the second digital certificate issuing portion based on the first digital certificate, and after establishing the connection, causing the second digital certificate issuing portion to perform a process for issuing a second digital certificate that is a formal digital certificate of the information processing apparatus.

A system for issuing a digital certificate to an information processing apparatus that joins a network, the system including a first digital certificate issuing portion, and a second digital certificate issuing portion. The first digital certificate issuing portion includes a first digital certificate generating portion that generates a first digital certificate that is a provisional digital certificate of the information processing apparatus, and an output portion that outputs the first digital certificate generated by the first digital certificate generating portion. The second digital certificate issuing portion includes a connection establishing portion that establishes a connection for encryption communication with the information processing apparatus based on the first digital certificate, and a second digital certificate generating portion that generates a second digital certificate that is a formal digital certificate of the information processing apparatus.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A method for managing an information processing apparatus, the method comprising the steps of:
   arranging a first digital certificate issuing organization and a second digital certificate issuing organization;
   issuing a first digital certificate that is a provisional digital certificate from the first digital certificate issuing organization to the information processing apparatus;
   establishing a connection for encrypted communication, by using the first digital certificate, between the information processing apparatus and the second digital certificate issuing organization, the first digital certificate enabling the information processing apparatus to join a first network that is a trial network but not enabling the information processing apparatus to join a second network that is a non-trial network operated independent of the first network;
   checking whether or not the information processing apparatus meets a standard of security during a trial use in which the information processing apparatus joins the first network, the checking including one or more of the following: checking whether the information processing apparatus is infected by a virus, checking whether the information processing apparatus has a security hole, and checking whether the information processing apparatus is altered; and
   after establishing the connection between the information processing apparatus and the second digital certificate issuing organization and confirming that the information processing apparatus meets the standard of security, issuing a second digital certificate that is a formal digital certificate from the second digital certificate issuing organization to the information processing apparatus, the second digital certificate enabling the information processing apparatus to join the second network.

2. The method according to claim 1, wherein the first digital certificate issuing organization issues the first digital certificate that is a common digital certificate to a plurality of the information processing apparatuses.

3. The method according to claim 1, wherein a validity period is set for the first digital certificate and the connection between the information processing apparatus and the second digital certificate issuing organization is established only during the validity period.

4. The method according to claim 1, wherein the first network and the second network are established independently of each other.

5. The method according to claim 1, wherein
   the information processing apparatus generates a pair of a public key and a private key and sends the public key and identification information to the second digital certificate issuing organization, and
   the second digital certificate issuing organization confirms the information processing apparatus based on the identification information, and after that, issues the second digital certificate including the public key.

6. The method according to claim 1, wherein the second digital certificate issuing organization verifies that the information processing apparatus is an apparatus authenticated by the first digital certificate issuing organization based on the first digital certificate obtained from the information processing apparatus.

7. The method according to claim 1, wherein a connection for Secure Sockets Layer communication is established between the information processing apparatus and the second digital certificate issuing organization.

8. The method according to claim 1, wherein the information processing apparatus discards the first digital certificate after obtaining the second digital certificate.

9. A system comprising:
   a first information processing apparatus;
   a first digital certificate issuing server that is operable to issue, to the first information processing apparatus, a first digital certificate that is a provisional digital certificate;
   a second information processing apparatus that is operable to establish a first network that is a trial network; and
   a second digital certificate issuing server that is operable to issue, to the first information processing apparatus, a second digital certificate that is a formal digital certificate, the second digital certificate permitting the first information processing apparatus to join a second network that is a non-trial network operated independent of the first network,
   wherein the first information processing apparatus is operable to establish the second network,
   wherein the second digital certificate issuing server includes a first processor programmed to:
      receive the first digital certificate from the first information processing apparatus,
      verify whether the first information processing apparatus is an apparatus authenticated by the first digital certificate issuing server based on the received first digital certificate, and
      issue the second digital certificate to the first information processing apparatus after verifying that the first information processing apparatus is an apparatus authenticated by the first digital certificate issuing server and that the first information processing apparatus meets a standard of security, and
   wherein the second information processing apparatus includes a second processor programmed to:
      receive the first digital certificate from the first information processing apparatus,
      verify whether the first information processing apparatus is an apparatus authenticated by the first digital certificate issuing server based on the received first digital certificate,
      verify the first information processing apparatus meets the standard of security through a trial operation of the first information processing apparatus on the first network, the standard of security including one or more of the following: whether the first information processing apparatus is infected by a virus, whether the first information processing apparatus has a security hole, and whether the first information processing apparatus is altered, and
      allow the first information processing apparatus to perform communication after verifying that the first information processing apparatus is an apparatus authenticated by the first digital certificate issuing server and the first information processing apparatus meets the standard of security, established through a trial use during which the first information processing apparatus joins the first network.

10. The system according to claim 9, wherein the first digital certificate issuing server issues the first digital certificate that is a common digital certificate to a plurality of information processing apparatuses.

11. The system according to claim 9, wherein a validity period is set for the first digital certificate and the first and second processors are programmed to confirm whether the first digital certificate is a digital certificate within the validity period.

12. The system according to claim 9, wherein the second digital certificate issuing server is operable to receive a public key generated by the first information processing apparatus, and the second digital certificate issuing server is operable to issue the second digital certificate including the public key.

13. The system according to claim 9, wherein the second digital certificate issuing server is operable to receive identification information of the first information processing apparatus, and the processor of the second digital certificate issuing server is further programmed to confirm the first information processing apparatus based on the identification information.

14. A system comprising:
a first information processing apparatus;
a first digital certificate issuing server operable to issue, to the first information processing apparatus, a provisional digital certificate;
a second information processing apparatus operable to establish a trial network operated independent of a non-trial network, the second information processing apparatus including:
  a first network interface operable to receive the provisional digital certificate from the first information processing apparatus over the trial network, and
  a first processor programmed to:
    verify whether the first information processing apparatus is an apparatus authenticated by the first digital certificate issuing server based on the provisional digital certificate received by the first network interface,
    verify the first information processing apparatus meets a standard of security through a trial operation of the first information processing apparatus on the trial network, the standard of security including one or more of the following: whether the first information processing apparatus is infected by a virus, whether the first information processing apparatus has a security hole, and whether the first information processing apparatus is altered, and
    allow the first information processing apparatus to perform communication after verifying that the first information processing apparatus is an apparatus authenticated by the first digital certificate issuing server and meets the standard of security;
a second digital certificate issuing server operable to issue, to the first information processing apparatus, a formal digital certificate, the formal digital certificate enabling the first information processing apparatus to join the non-trial network, the second digital certificate issuing server including:
  a second network interface operable to receive the provisional digital certificate from the first information processing apparatus, and
  a second processor programmed to:
    verify whether the first information processing apparatus is an apparatus authenticated by the first digital certificate issuing server based on the provisional digital certificate received by the second network interface, and
    transmit via the second network interface the formal digital certificate to the first information processing apparatus after verifying that the first information processing apparatus is an apparatus authenticated by the first digital certificate issuing server and the first information processing apparatus meets the standard of security.

15. A method for managing an information processing apparatus, the method comprising the steps of:
receiving at the information processing apparatus a first digital certificate that is a provisional digital certificate from a first digital certificate server issued by a first digital certificate issuing organization, the first digital certificate enabling the information processing apparatus to join a first network that is a trial network but not enabling the information processing apparatus to join a second network that is a non-trial network operated independent of the first network;
establishing a connection between the information processing apparatus and the first network using the first digital certificate and checking whether the information processing apparatus meets a standard of security, the checking including one or more of the following: checking whether the information processing apparatus is infected by a virus, checking whether the information processing apparatus has a security hole, and checking whether the information processing apparatus is altered; and
after confirming the information processing apparatus meets the standard of security, establishing a connection for encrypted communication between the information processing apparatus and a second digital certificate issuing server using the first digital certificate and receiving at the information processing apparatus a second digital certificate that is a formal digital certificate issued by a second digital certificate issuing organization, the second digital certificate enabling the information processing apparatus to join the second network.

* * * * *